United States Patent [19]

Morgan

[11] 4,022,283

[45] May 10, 1977

[54] TOOL FOR REMOVING PLANT GROWTH FROM PERIPHERAL ZONES OF SPRINKLER HEADS

[76] Inventor: Marvel B. Morgan, 3027 E. Sample Ave., Fresno, Calif. 93710

[22] Filed: Jan. 23, 1976

[21] Appl. No.: 651,696

[52] U.S. Cl. .................................. 172/15; 30/240; 30/276; 30/DIG. 7; 56/10.2; 56/10.5
[51] Int. Cl.² ...................................... A01D 35/264
[58] Field of Search .............................. 172/13–18, 172/41, 111, 2, 75; 56/10.2, 10.3, 10.5; 30/240, 276, DIG. 7

[56] References Cited

UNITED STATES PATENTS

| | | | |
|---|---|---|---|
| 1,545,835 | 7/1925 | Komow et al. ...................... | 30/276 |
| 3,143,176 | 8/1964 | Drane, Jr. .......................... | 172/13 X |
| 3,174,224 | 3/1965 | Rousselet ......................... | 30/276 X |
| 3,554,293 | 1/1971 | Aman et al. ........................ | 172/13 |
| 3,555,680 | 1/1971 | Ford .................................. | 30/276 |
| 3,905,103 | 9/1975 | Ford et al. .......................... | 30/276 |

*Primary Examiner*—Paul E. Shapiro
*Attorney, Agent, or Firm*—Huebner & Worrel

[57] ABSTRACT

A portable power tool particularly suited for use in removing plant growth and debris from the peripheral zones of upstanding heads for subterranean sprinkler systems. The tool is characterized by a portable frame adapted to be positioned above an upstanding sprinkler head in an operative relationship therewith, a drive shaft mounted on the frame having a rotatable cutting head connected thereto for cutting an annular swath about the sprinkler head in response to rotary motion imparted to the drive shaft, and an electrically energizable motor connected to the drive shaft and adapted to respond to a positioning of the frame into an operative relationship with a sprinkler head for imparting rotary motion to the drive shaft.

8 Claims, 4 Drawing Figures

TOOL FOR REMOVING PLANT GROWTH FROM PERIPHERAL ZONES OF SPRINKLER HEADS

BACKGROUND OF THE INVENTION

1. Field of the Invention

The invention generally relates to power tools for use in trimming plant growth from the vicinity of sprinkler heads, and more particularly to a portable power tool mounted on a frame, and adapted to respond to a positioning thereof in an operative relationship with a sprinkler head for removing plant growth and debris from the peripheral zone of the head.

2. Description of the Prior Art

The prior art, of course, is replete with power tools, often referred to as edgers, particularly suited for use in trimming or manicuring lawns. Often, such tools include rotary blades which can be positioned in a multiplicity of planes and driven in rotation for uniformly and closely trimming plant growth and/or removing dirt and other debris in order to impart to a given lawn a neatly manicured appearance.

As can be appreciated by those familiar with lawn care, it is common practice to employ sprinkler systems for purposes or irrigating lawns at predetermined intervals, in order to enhance plant growth. Frequently, the systems so employed are buried beneath the surface of the lawn and, therefore, are herein referred to as subterranean sprinkler systems. These systems include uniformly spaced, upstanding sprinkler heads which serve to deliver water, and/or other fluids, to the lawn in predetermined spray patterns in order to assure that proper coverage of the lawn is achieved. The sprinkler heads frequently are positioned at or close to ground level in order to accommodate passage thereover of mowers and the like. Unfortunately, there is a tendency for lawn grass and other plant growth to grow into a shielding pattern about sprinkler heads so that resulting spray patterns are interrupted by the upstanding grass. Thus a loss in efficiency of the system is experienced and the overall appearance of the lawn is impaired.

Attempts have been made to solve this problem in many ways. For example, one technique is to utilize so-called pop-up sprinklers which are positioned below but rise above the level of adjacent plant growth, when operated in order to assure that proper coverage is achieved and yet accommodate passage of a mower. While this solution has many desirable attributes, it does not provide a totally satisfactory solution. For example, after such sprinkler heads have been in operation for some time, difficulty frequently is encountered in their operation, due to fouling resulting from the presence of aggregate and the like within the line. Consequently, it has been found that the most practical approach to the problem is to position conventional sprinkler heads at levels which permit mowers to be passed thereover, thus requiring hand-trimming of the grass in the immediate vicinity of the sprinkler head. Such operations are both tedious and expensive.

As should be apparent, in view of the foregoing, there currently exists a need for a practical, and economic, manually operable power tool which readily can be utilized in removing plant growth and debris from the peripheral zones of suitably positioned, upstanding sprinkler heads for subterranean sprinkler systems, without impairing the operation of the sprinkler heads for their intended purposes.

It is, therefore, the general purpose of the instant invention to provide a practical and economic manually operable power tool particularly suited for use in removing plant growth and debris from the peripheral zones of upstanding sprinkler heads for subterranean sprinkler systems.

OBJECTS AND SUMMARY OF THE INVENTION

It is, therefore, an object of the instant invention to provide an economic and practical power tool for use in manicuring lawns.

It is another object of the instant invention to provide a manually operable power tool for removing plant growth from the peripheral zones of upstanding sprinkler heads.

It is another object to provide a practical, economic, and manually operable power tool which responds to a manual positioning thereof in operative alignment with a sprinkler head for removing grass and debris from a concave zone concentrically related to the sprinkler head.

It is another object to provide a power tool characterized by a portable frame, manually positionable above an upstanding sprinkler head and characterized by a rotatable cutting head adapted to respond to a positioning of the tool in an operative relationship with an upstanding sprinkler head for a subterranean sprinkler system for removing plant growth and debris from a concave peripheral zone adjacent the upstanding head.

Another object is to provide a portable power tool particularly suited for use in manicuring lawns, although not necessarily limited in use thereto, since the tool can be utilized in removing debris such as plant growth and the like in a uniformly configured zone concentrically related to other upstanding bodies, such as plumbing and electrical fittings projected substantially above ground level.

These and other objects and advantages are achieved through the use of a portable power tool characterized by a portable frame adapted to be positioned above an upstanding sprinkler head or the like, a movable motor resiliently supported on the frame, and a drive shaft projected from the motor having a rotary cutting head connected thereto responsive to a positioning of the frame above a sprinkler head for cutting a concave swath about the sprinkler head, as will become more readily apparent by reference to the following description and claims in light of the accompanying drawings.

BRIEF DESCRIPTION OF THE DRAWINGS

FIG. 3 is a perspective view of a blade provided for the cutting head shown in FIGS. 1 and 2.

FIG. 4 is a partially sectioned view taken generally along line 4—4 of FIG. 2.

DESCRIPTION OF THE PREFERRED EMBODIMENT

Figure 1:
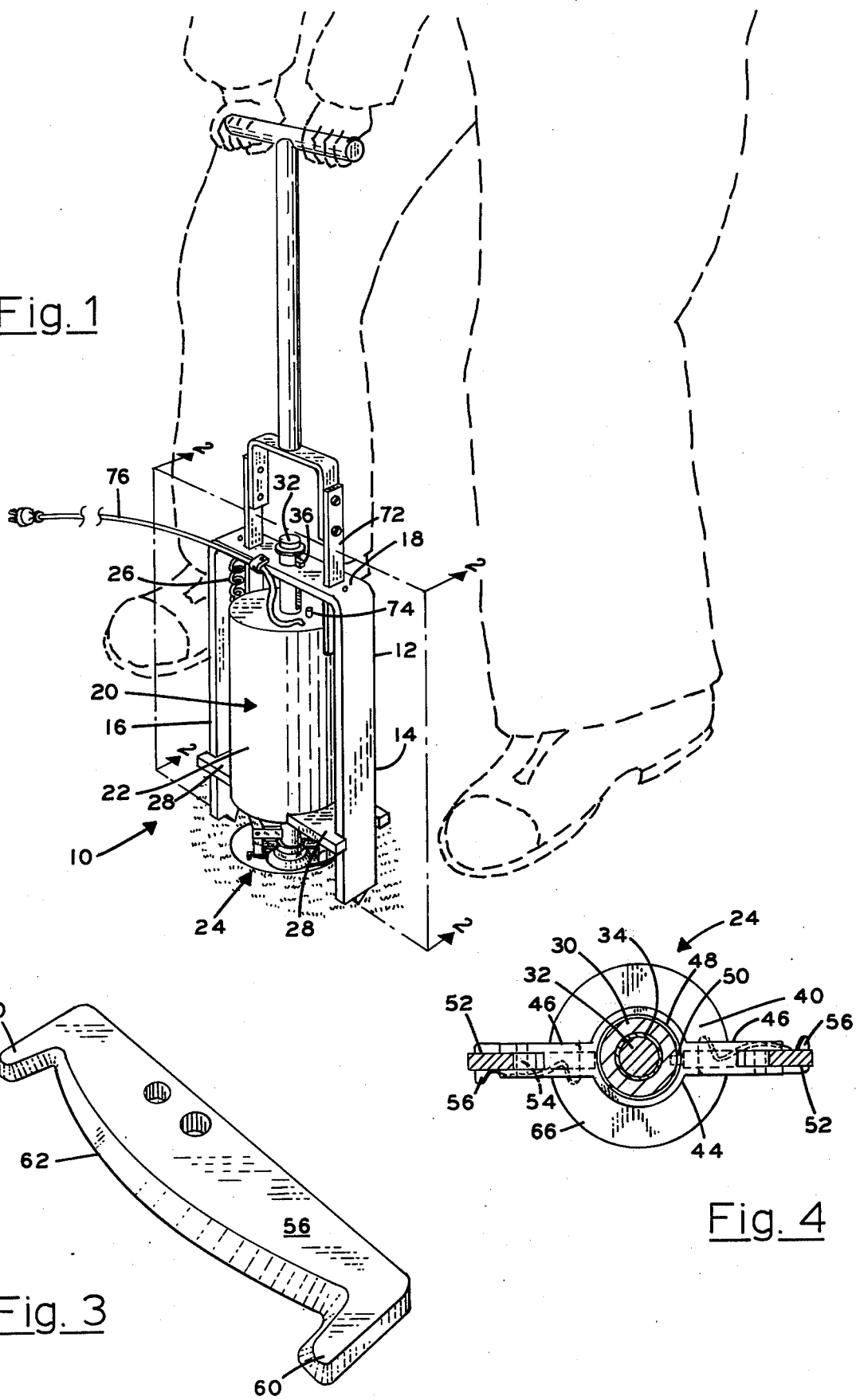
FIG. 1 is a perspective view of a power tool which embodies the principles of the instant invention, illustrated in an operative environment wherein the cutting head thereof is positioned in operative relation with a sprinkler head, alternate positions for the motor and one leg of the embodying structure being indicated in broken line.

Referring now to the drawings, with more particularity, wherein like reference numerals designate like or corresponding parts throughout the several views, there is shown in FIG. 1 a cutting tool, generally designated 10, which embodies the principles of the instant invention.

The power tool 10 is a portable power tool adapted to be manually manipulated. Accordingly, it is to be understood that the tool 10 is fabricated employing materials characterized by adequate strength/weight ratios using fabrication techniques well understood by those familiar with the design and fabrication of electrically energizable power tools designed for use in the field of gardening. Therefore, a detailed description of the materials and techniques employed in the fabrication of the power tool 10 is omitted.

The power tool 10 includes a portable frame 12 of a generally U-shaped configuration having a pair of legs 14 and 16 arranged in mutual parallelism and interconnected through a transversely related base 18. Between the legs 14 and 16 there is provided a power unit including an electrically energizable motor 20. The motor 20 is, in practice, a universal electric motor having a housing 22 of a generally cylindrical configuration and serves to drive a coaxially aligned cutting head, generally designated 24, positionable in contiguous relation with an upstanding sprinkler head.

The motor 20 is suspended between the legs 14 and 16 by helical springs 26, each having one end connected with the base 18 and the opposite end connected with a slide 28 to which the motor housing 22 is connected utilizing any suitable fasteners, such as nut-and-bolt assemblies and the like. The springs are characterized by a constant such that the motor 20 is supported in juxtaposition with the base 18 of the frame when the springs are substantially relaxed.

It is important to note that the motor 20 includes an axially extended drive shaft 30 which is supported for rotation by suitable bearings, not designated. The drive shaft 30 is arranged in concentric relation with the rotor, not designated, of the motor 20 and is connected, in any suitable manner, to rotate therewith in response to an electrical energization of the motor. The drive shaft 30 is of a tubular configuration and receives therein a pilot shaft 32. The pilot shaft 32 is concentrically related with a drive shaft and is supported for axial reciprocation relative thereto. Suitable bushing sleeves 34 are interposed between the concentric surfaces of the drive shaft and pilot shaft for purposes of accommodating relative motion therebetween, in both angular and axial directions.

Figure 2:
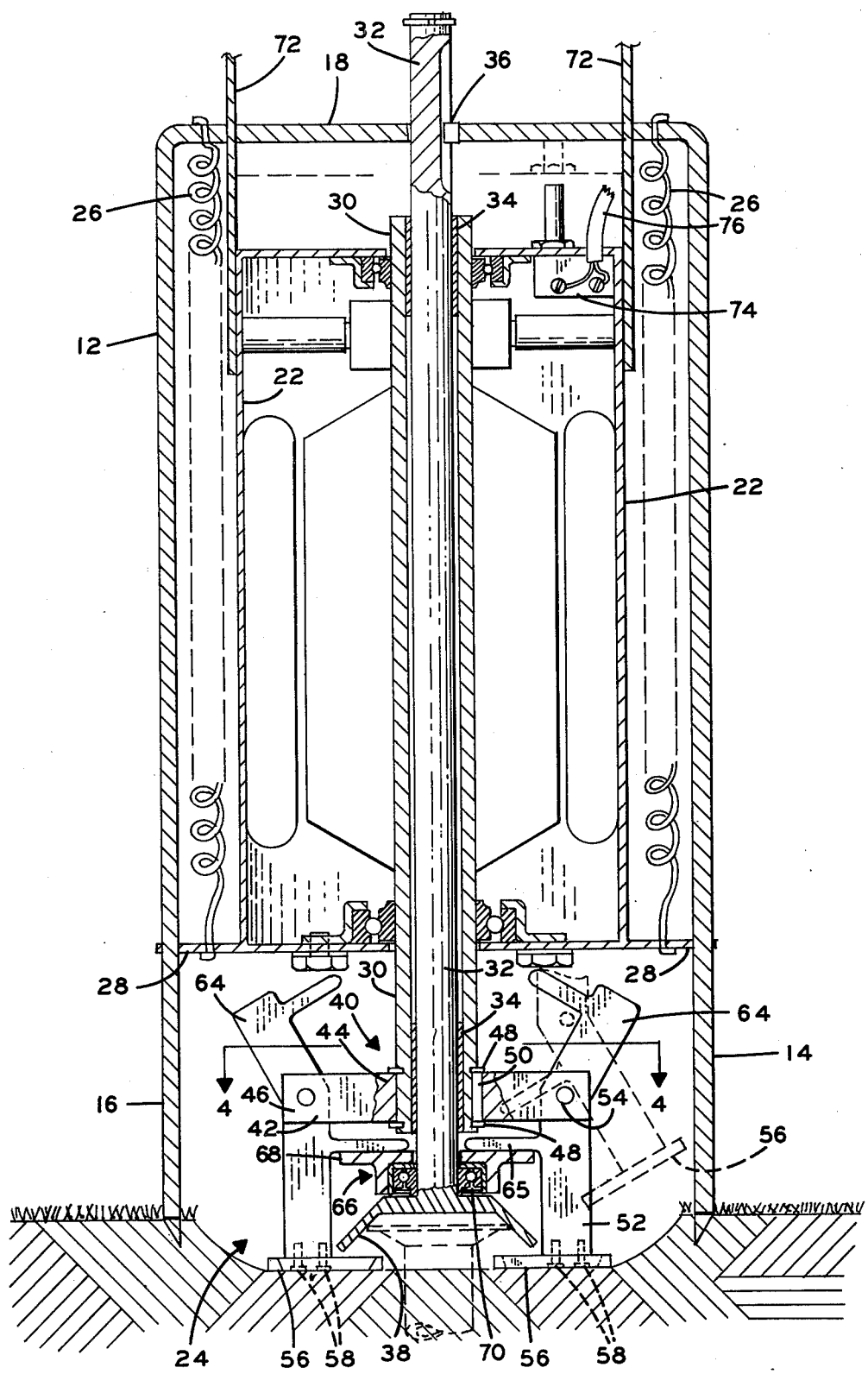
FIG. 2 is a cross-sectional view, taken generally along line 2—2 of FIG. 1.

As best shown in FIG. 2, the pilot shaft 32 extends through an aperture, not designated, formed in the base 18 of the frame 12. The pilot shaft 32 is connected with the frame 12 through a key and keyway assembly 36 which serves to preclude rotation of the pilot shaft relative to the frame while accommodating axial displacement of the shaft. The axial dimension of the keyway serves to dictate the throw of axial displacement operatively imparted to the pilot shaft relative to the frame, in a manner which will hereinafter be more fully described.

At the end of the pilot shaft 32, opposite the key and keyway assembly, there is mounted, in a suitable manner, a socket 38 suitably configured for receiving an upstanding sprinkler head, not designated, in coaxial alignment with the pilot shaft. The socket 38 is concentrically related to the cutting head 24, which, in turn, is mounted on the end of the drive shaft 30. It can, therefore, be appreciated that the cutting head 24 is movable with respect to the socket 38, in both angular and axial directions.

A yoke assembly, generally designated 40, is provided for connecting the cutting head 24 on the drive shaft 30. The yoke consists of a spider 42 having a substantially annular body 44 and a pair of radially extended arms 46, FIG. 4.

The yoke assembly 40 may be connected with the drive shaft 30 in any suitable manner. However, as shown, the body 44 of the spider 42 includes a concentric bore, not designated, having an internal diameter substantially equal to the external diameter of the drive shaft 30 which serves to receive the drive shaft in concentric relation therewith. The spider is supported against axial displacement relative to the drive shaft by suitable means, including a plurality of locking rings 48 employed in a manner well understood. Of course, other fasteners such as collar nuts and the like can be employed for purposes of securing the yoke assembly 40 against axial displacement relative to the drive shaft 30. Preferably, a key and keyway assembly 50 is employed for securing the yoke against angular displacement relative to the drive shaft. Since the design and function of locking rings, collars, nuts, and keyway assemblies are well understood, a detailed description of the locking rings 48 and the keyway assembly 50 is omitted in the interest of brevity. It suffices to understand that the locking rings 48 seat in suitable annular grooves while the keyway assembly includes a first elongated keyway, not designated, machined in the surface of the drive shaft 30 and a second keyway comprising a mirror image of the first keyway is machined in the adjacent surface of the bore of the body 44 of the spider 42 and that the keyways simultaneously receive a common key, not designated, which serve to lock the spider to the drive shaft to rotate therewith.

As should now be apparent, energization of the motor 20 serves to drive the drive shaft 30 in rotation, whereupon the yoke assembly 40 is caused to rotate in a plane normally related to the axis of rotation for the drive shaft. Rotary motion of the yoke assembly 40 is thus achieved for driving the arms 46 in angular displacement about the axis of the drive shaft.

Pivotally connected to the extended or distal end of each of the arms 46 there is a blade supporting leg 52. Each of the legs 52 is supported for inward and outward displacement relative to the axis of rotation of the drive shaft. The legs are connected by suitable pivot pins 54 extended therethrough near the midportions thereof. To each of the legs there is rigidly affixed to an orthogonally related cutting blade 56. The cutting blade 56 is rigidly secured to the blade supporting leg 52, in a manner such that the blade extends in radial relation with respect to the sprinkler head when the legs 52 are vertically oriented. Suitable fasteners such as screws 58 and the like are employed for securing the blades 56 to the legs 52, at substantially right angles thereto.

As a practical matter, each of the cutting blades 56 is of an elongated configuration and is characterized by a pair of protuberances 60 projected orthogonally, in a common direction, from the opposite ends of the blade. A continuous cutting surface 62 is extended along the length of the side edge of the blade and terminates at the apex of each of the protuberances. Thus each of the blades 56 serves to sever plant growth in a scything action as rotary motion is imparted to the yoke assembly 40 and the legs 52 to assume a substantially vertical orientation.

Since the cutting blades 56 are substantially orthogonally related to the longitudinal axis of the blade supporting legs 52 to which they are affixed, the cutting blades 56, extend horizontally to a position immediately beneath the expanded portion of the sprinkler head when the legs 52 are vertically oriented. However, the lengths of the cutting blades 56 are such that the ends of the cutting blades adjacent the sprinkler head are spaced slightly from the standpipe supporting the sprinkler head.

The blade supporting legs 52 are provided, at ends thereof opposite the cutting blades 56, counterbalancing masses 64. The center of gravity for each of the masses is such that the blade supporting legs 52 assume an inclined disposition, when the frame 12 of the power tool 10 is vertically disposed. The masses 64, in effect, function as resilient stops which limit gravitating pivotal displacement of the legs. The combined center mass for the legs 52, blades 56 and that of the mass 64 for the legs 52, is so related to the pivot pins 54 that the legs gravitate outwardly toward an inclined disposition, relative to the axis of the shaft 30, in order to spread the blades 56 a distance which accommodates passage of a sprinkler head. However, when rotary motion is imparted to the yoke assembly 40 the legs 52 are urged outwardly toward a horizontal disposition under the influence of inertial forces.

In order to force the legs 52 inwardly toward a vertical disposition, during periods in which the yoke assembly 40 is driven in rotation, each of the blade supporting legs 52 is configured to provide an orthogonally related foot 65. When the legs 52 are inclined, under the influence of gravity, the feet are inclined toward the axis of rotation for the shaft 30 when the blades are spread. Of course, the feet are radially extended toward the drive shaft when the legs are vertically oriented. Hence, it is possible to force the legs 52 toward a vertical disposition by engaging the feet 65 and applying a pivoting force to the extended ends of the feet.

Interposed between each foot 65 and the socket 38, there is a thrust bearing assembly 66 through which a pivoting force is applied to the feet. The assembly 66 includes an annular wear plate 68 supported for rotation by a thrust bearing 70. This bearing is concentrically related to the pilot shaft 32 and is seated in juxtaposition with the socket 38. Consequently, it should be apparent that the wear plate 68 is supported by the pilot shaft 32, beneath the feet 65 for displacement relative to the feet. Moreover, the relationship of the diameter of the wear plate and the length of the feet is such that the ends of the feet are above the plate 68, even when the blades are spread to receive a sprinkler head.

It is important, also, to note that in order to cause the wear plate 68 to engage the feet 65, the motor 20 is displaced against the springs 26. In order to facilitate such displacement, upstanding handle brackets 72 are affixed to the housing 22 for supporting a suitable handle, not designated, as indicated in FIG. 1. By grasping the handle, it is possible for an operator to lift the power tool, position it directly above a sprinkler head, for positioning the socket 38 in a received relationship with the sprinkler head, and force the motor downwardly, against the springs 26. Continued downward displacement of the motor, causes the pilot shaft to retract, relative to the drive shaft 30, for thus forcing the wear plate 68 into engagement with the extended ends of the feet 65 for thus causing the legs 52 to pivot inwardly. Of course, as the motor is lifted, by the handle, the centrifugal force is acting on the blade supporting legs 52 causing the legs to withdraw the cutting blades 56 from beneath the sprinkler head, in a manner substantially consistent with that of a fly ball.

Energization of the motor 20 is controlled by a normally-open, spring-biased switch 74 connected between the motor and a source of electrical power to which the motor is connected by a suitable lead 76. The switch 74 includes a spring-biased plunger positioned to engage the base 18 and hold the switch open when the motor is in juxtaposition with the base and to open as disengagement of the plunger and the base occurs as the motor is forced downwardly out of juxtaposed relationship with the base 18.

OPERATION

It is believed that in view of the foregoing description, the operation of the device will readily be understood and it will be briefly reviewed at this point.

With the power tool 10 assembled in the manner hereinbefore described, and connected with a source of electrical energy through the lead 76, the motor is prepared for operation. An operator lifts the power tool 10 by its handle with the bracket 72 and positions the power tool immediately above a selected sprinkler head, whereupon the tool is lowered as the head is passed between the blades 56. It is important to note that the weight of the frame 12 is insufficient to extend the springs 26 so that the motor remains in juxtaposition with the base 18 of the frame 12. As the socket 38 receives the sprinkler head the weight of the tool causes the pilot shaft 32 to retract permitting the wear plate to engage the feet 65. The operator now presses downwardly on the handle causing the plate 68 to pivotally displace the feet 65, at substantially the same time as the plunger for the switch 74 disengages the base member 18 of the frame 12 for selectively energizing the motor.

Upon being energized, the motor serves to impart rotary motion to the drive shaft 30 which, in turn, serves to drive the spider 42 in angular displacement. Hence, the blade supporting legs 52, with the cutting blades 56 affixed thereto are driven in rotation. Continued downward displacement of the motor causes retraction of the pilot shaft 32 to occur against force vectors developed by the rotation of the legs and applied through the feet 65 to the wear plate 68. Continued retraction of the pilot shaft, in turn, causes the blade supporting legs 52 to pivot downwardly in vertical planes, so that the blades 56 are caused to progress along arcuate paths in vertical planes until pilot shaft displacement is complete. The extent of pilot shaft displacement is dictated by the length of the keyway 36.

Preferably, once the pilot shaft 32 has reached the upward limit of its upward displacement, the cutting blades 56 have progressed along arcuate paths in vertical planes and assumed a substantially horizontal position beneath the sprinkler head in spaced relation with the standpipe therefor. As the blades 56 traverse their paths, between the extremities thereof they sever and remove plant growth and debris from a zone having an oblated hemispheric configuration surrounding the head.

Upon lifting the handle, the motor 20 is retracted permitting the pilot shaft 32 to gravitate downwardly relative to the drive shaft 30. Of course, continued rotation of the drive shaft 30 imparts a radially directed force to the blade supporting legs 52 for applying a moment about the pivot pins 54. Thus a downward component of force is applied to the wear plate 68, as the feet 65 perform a camming function urging the wear plate 68 to advance downwardly. Downward advancement of the feet permits the blade supporting legs 52 to swing outwardly through a distance sufficient for clearing the sprinkler head. Once the switch 74 engages the base member 18 the circuit is again interrupted and operation of the motor is terminated and the power tool 10 is readied for another cycle of operation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A tool for trimming lawn and the like about a sprinkler head comprising
   A. a tubular drive shaft,
   B. powered means for rotating said drive shaft,
   C. a yoke mounted on said drive shaft in concentric relation therewith including a spider having a plurality of radially extended arms,
   D. a plurality of blade supporting legs pivotally connected to the distal ends of said arms and supported thereby for pivotal displacement in respective planes intersecting the axis of rotation of said drive shaft, along the length thereof,
   E. a plurality of elongated blades rigidly affixed to said legs in angular relationship therewith, each blade of said plurality of blades being provided with a pair of opposite end portions projected in a substantially common direction from the longitudinal axis of the blade and a cutting surface extended between the opposite ends of the blade along one side edge thereof.
   F. a counterbalancing mass mounted on each of said legs at the ends thereof opposite said blades for biasing said legs in outward pivotal displacement when the drive shaft is stationary and the center of balance of the legs, blades and counterbalancing mass being such that the legs are urged in outward pivotal displacement by centrifugal force when the drive shaft is rotated,
   G. a pilot shaft extended axially through said drive shaft and supported thereby for adjustable axial positioning,
   H. a socket affixed to one end of the pilot shaft adapted to receive an upstanding sprinkler head in coaxial alignment with the drive shaft, whereby axial displacement is imparted to the pilot shaft in response to engagement of the socket with the sprinkler head,
   I. means for connecting said socket with said yoke including a thrust bearing assembly concentrically related to said pilot shaft in interposed relation with said spider and said socket, and
   J. a foot projected from each of said legs adapted to be engaged by said thrust bearing assembly as the pilot shaft is raised relative to the drive shaft for pivotally displacing said legs inwardly.

2. A power tool for removing plant growth and debris from a zone of an oblated hemispheric configuration concentrically related to an upstanding sprinkler head for a subterranean irrigation system comprising:
   A. a portable frame adapted to be positioned above a selected sprinkler head and characterized by a pair of legs disposed in spaced parallelism terminating in an end portion adapted to be inserted into the ground for imparting stability to the frame;
   B. an electrically energizable motor disposed between said legs having a rotary output shaft characterized by an axis of rotation coincident with the longitudinal axis of symmetry for said frame;
   C. suspension means supporting said motor for rectilinear displacement along a path of displacement coincident with said axis of symmetry including a plurality of spring members connecting the motor with said frame in a supported relationship therewith, and guide members connecting said motor with said frame for restraining the motor against rotation and for guiding said motor along said path of displacement; and
   D. a cutting head connected to the distal end of said rotary output shaft including a yoke connected to said shaft in concentric relation therewith comprising,
      1. a spider having a plurality of radially extended arms,
      2. a plurality of blade supporting legs pivotally connected to the distal ends of said arms and supported thereby for pivotal displacement in planes intersecting the axis of rotation for said drive shaft, along the length thereof,
      3. a plurality of elongated blades rigidly fixed to said legs in angular relationship therewith, each blade of said blades being provided with a pair of opposite end portions projected in a substantially common direction from the longitudinal axis of the blade and a cutting edge extended between the ends and along one side edge thereof,
      4. a counterbalancing mass mounted on each of said legs at the ends thereof opposite said blades for biasing said legs in pivotal displacement,
      5. a pilot shaft extended axially through said drive shaft and supported thereby for axial reciprocation,
      6. a socket affixed to said pilot shaft in coaxial alignment with the drive shaft adapted to receive an upstanding sprinkler head,
      7. means for connecting said socket with said yoke including a thrust bearing assembly concentrically related to said pilot shaft in interposed relation with said spider and said socket, and
      8. a foot projected from each of said legs adapted to be engaged by said thrust bearing assembly as the pilot shaft is displaced; and
   E. circuit means for connecting said motor with a source of electrical potential including a switch adapted to close the circuit means in response to displacement of said motor for electrically energizing the motor.

3. A tool for edging lawn and the like about a sprinkler head comprising:
   A. a portable frame;
   B. guide means mounted in the frame adapted to fit downwardly over a sprinkler head to locate the frame relative to such a head;

C. a drive shaft rotatably mounted in the frame in a substantially axially erect position concentric to the guide means;
D. arms oppositely outwardly extended from the lower end of the drive shaft;
E. legs pivotally mounted on the outer ends of the arms for movement about axes tangential to a circle concentric to the drive shaft and downwardly extended therefrom for movement toward and from said shaft;
F. blades mounted on the lower ends of the legs for lawn engagement;
G. drive means for rotating the drive shaft whereby centrifugal force urges the lower ends of the legs and their blades outwardly; and
H. manually controlled means for pivoting the legs and their blades inwardly against such centrifugal force during rotation of the drive shaft to cut a concavity in the lawn about such a sprinkler head.

4. A tool for trimming lawn and the like about a sprinkler head comprising:
A. a portable frame;
B. a pilot shaft mounted in a substantially erect position in the frame for slidable elevational movement therein;
C. a downwardly disposed socket member mounted on the lower end of the pilot shaft adapted to fit over a sprinkler head and center the pilot shaft on the head;
D. a tubular drive shaft mounted for rotation on the pilot shaft having a lower end upwardly adjacent to the socket member;
E. arms oppositely outwardly extended from the lower end of the drive shaft;
F. legs pivotally mounted on the outer ends of the arms for movement about axes tangential to a circle concentric to the pilot shaft toward and from said shaft, said legs having lower ends;
G. blades mounted on the lower ends of the legs for lawn engagement;
H. drive means for rotating the drive shaft whereby centrifugal force urges the lower ends of the legs and their blades outwardly to positions with the blades spaced unsufficiently to receive a sprinkler head therebetween;
I. a thrust bearing mounted on the pilot shaft downwardly spaced from the drive shaft;
J. a wear plate borne by the thrust bearing;
K. feet individually integral with the legs engaged with the wear plate whereby the legs can be forced downwardly to pivot the blades beneath the sprinkler head against the centrifugal force thereof by moving the drive shaft downwardly with respect to the pilot shaft; and
L. resilient means urging the drive shaft upwardly with respect to the pilot shaft.

5. A tool for trimming lawn and the like about a sprinkler head comprising:
A. means engageable downwardly on a sprinkler head in centering relation thereon,
B. a blade,
C. means mounting the blade on the sprinkler head engaging means for rotation concentrically thereabout and for pivotal movement about an axis substantially tangential to a circle concentric to the sprinkler head engaging means between a substantially horizontal inner position below the engageable means and an inwardly sloped outer position radially outwardly of and above the sprinkler head engaging means,
D. powered means for rotating the mounting means, and
E. means for pivoting the blade between said positions while the mounting means is rotated to cut a concavity in the lawn about the sprinkler head substantially concentrically thereof.

6. A tool for trimming lawn and the like about a sprinkler head comprising:
A. a socket member adapted to rest upon and center itself on such a sprinkler head,
B. means mounted on the socket member for rotation about a substantially erect axis concentric to the socket member,
C. a leg pivotally mounted on the rotatable means above the socket member for movement about an axis substantially tangential to a circle concentric to the axis of rotation between a downwardly extended position and a relatively outwardly pivoted position, and
D. a blade mounted on the leg substantially radially of the axis of rotation for movement in response to pivotal movement of the leg between an inner substantially horizontal position below the socket member when the leg is in downwardly extended position and an outer downwardly and inwardly sloped position about the socket member when the leg is in outwardly pivoted position.

7. A tool for trimming lawn and the like about a sprinkler head comprising
A. a pilot shaft;
B. means on the pilot shaft engageable with a sprinkler head to center the shaft in axially erect position on the head;
C. means rotatably mounted on the shaft for adjustable positioning longitudinally thereof;
D. drive means connected to the rotatable means for rotating the rotatable means on the shaft;
E. an arm mounted on the rotatable means and substantially radially extended therefrom for rotation therewith;
F. a leg pivotally mounted on the arm for movement between a downwardly extended position and a relatively outwardly pivoted position;
G. a blade mounted on the leg extended substantially horizontally inwardly beneath the head when the leg is in downwardly extended position and downwardly and inwardly extended from a position outwardly and above the head when the
H. a control linkage interconnecting the shaft and the leg pivotally positioning the leg between said positions in response to adjustable positioning of the rotatable means longitudinally of the shaft.

8. The tool of claim 7 including manual control means for adjustably positioning the rotatable means longitudinally of the shaft.

* * * * *

UNITED STATES PATENT AND TRADEMARK OFFICE
CERTIFICATE OF CORRECTION

PATENT NO. : 4,022,283
DATED : May 10, 1977
INVENTOR(S) : Marvel B. Morgan

It is certified that error appears in the above-identified patent and that said Letters Patent are hereby corrected as shown below:

Column 1, Line 25, delete "or" and insert --- of ---.

Column 7, Line 43, after "thereof" delete "." and insert --- , ---.

Column 9, Line 44, delete "unsufficiently" and insert --- sufficiently ---.

Column 10, Line 33, delete "about" and insert --- above ---.

Column 10, Line 55 after "the" in the second instance, insert --- leg is in it's outwardly extended position, and ---.

Signed and Sealed this twelfth Day of July 1977

[SEAL]

Attest:

RUTH C. MASON
Attesting Officer

C. MARSHALL DANN
Commissioner of Patents and Trademark